(12) United States Patent
Lee

(10) Patent No.: US 11,151,960 B2
(45) Date of Patent: Oct. 19, 2021

(54) ELECTRONIC APPARATUS INCLUDING DISPLAY PANEL CONFIGURED TO TURN ON AND OFF USING AN ILLUMINATION SENSOR, METHOD AND COMPUTER-READABLE RECORDING MEDIUM

(71) Applicant: SAMSUNG ELECTRONICS CO., LTD., Suwon-si (KR)

(72) Inventor: Sang-won Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 23 days.

(21) Appl. No.: 16/011,211

(22) Filed: Jun. 18, 2018

(65) Prior Publication Data

US 2019/0096357 A1  Mar. 28, 2019

(30) Foreign Application Priority Data

Sep. 26, 2017  (KR) .......................... 10-2017-0124393

(51) Int. Cl.
 *G02B 6/00* (2006.01)
 *G09G 5/00* (2006.01)
 (Continued)

(52) U.S. Cl.
 CPC .............. *G09G 5/003* (2013.01); *G02B 6/00* (2013.01); *G06F 1/266* (2013.01); *G06F 3/0304* (2013.01);
 (Continued)

(58) Field of Classification Search
 CPC .......... G09G 5/10; G09G 5/00; G09G 3/3426; G09G 3/147; G09G 3/3406; G09G 3/36; G06F 3/14; B60R 25/10
 See application file for complete search history.

(56) References Cited

U.S. PATENT DOCUMENTS

2005/0087671 A1* 4/2005 Park ..................... G09G 3/3406
 250/205
2005/0117190 A1* 6/2005 Iwauchi ............... G09G 3/3406
 359/237
(Continued)

FOREIGN PATENT DOCUMENTS

JP  2006-60353 A  3/2006
JP  2008-16963 A  1/2008
(Continued)

OTHER PUBLICATIONS

International Search Report dated Sep. 5, 2018 issued by the International Searching Authority in counterpart International Application No. PCT/KR2018/006682 (PCT/ISA/210).
(Continued)

*Primary Examiner* — Ke Xiao
*Assistant Examiner* — James S Nokham
(74) *Attorney, Agent, or Firm* — Sughrue Mion, PLLC

(57) ABSTRACT

An electronic apparatus is provided. The electronic apparatus includes a display; an illumination sensor; and a processor. The processor is configured to carry out a predetermined operation based on the illumination value being greater than or equal to a threshold, falling below the threshold for a predetermined time and thereafter being greater than or equal to the threshold. The processor is further configured to turn on the display based on the illumination value being greater than or equal to the threshold, falling below the threshold for the predetermined time and thereafter being greater than or equal to the threshold; or the illumination value being less than or equal to a second threshold, rising above the second threshold for the predetermined time, and thereafter being less than or equal to the second threshold, the second threshold being less than the threshold.

17 Claims, 15 Drawing Sheets

(51) Int. Cl.
*G06F 3/03* (2006.01)
*G06F 1/26* (2006.01)

(52) U.S. Cl.
CPC . *G09G 2330/026* (2013.01); *G09G 2330/027* (2013.01); *G09G 2354/00* (2013.01); *G09G 2360/144* (2013.01)

(56) References Cited

U.S. PATENT DOCUMENTS

| | | | | |
|---|---|---|---|---|
| 2008/0291139 | A1* | 11/2008 | Hsieh | G09G 5/00 345/77 |
| 2009/0094386 | A1* | 4/2009 | Wang | G06F 1/3203 710/10 |
| 2010/0194551 | A1* | 8/2010 | Chen | B60R 25/10 340/426.15 |
| 2012/0019493 | A1* | 1/2012 | Barnhoefer | H05B 41/3922 345/207 |
| 2012/0050158 | A1* | 3/2012 | Ahn | G06F 3/038 345/157 |
| 2013/0027370 | A1* | 1/2013 | Dunn | G06F 3/14 345/207 |
| 2014/0092119 | A1* | 4/2014 | Jung | G09G 5/10 345/589 |
| 2014/0176518 | A1* | 6/2014 | Min | G09G 3/20 345/207 |
| 2014/0362008 | A1* | 12/2014 | Tanada | G06F 1/3231 345/173 |
| 2014/0375669 | A1* | 12/2014 | Zhang | G09G 5/02 345/589 |
| 2015/0116389 | A1* | 4/2015 | Watanabe | G09G 3/3426 345/694 |
| 2015/0294627 | A1* | 10/2015 | Yoo | G06F 3/147 345/690 |
| 2016/0071488 | A1 | 3/2016 | Shen | |
| 2017/0053098 | A1* | 2/2017 | Hawkins | H04W 4/80 |

FOREIGN PATENT DOCUMENTS

| | | |
|---|---|---|
| JP | 2008-109274 A | 5/2008 |
| JP | 2010-191288 A | 9/2010 |
| JP | 4771839 B2 | 9/2011 |
| KR | 10-2010-0049494 A | 5/2010 |
| KR | 10-2012-0048389 A | 5/2012 |
| KR | 10-2014-0092071 A | 7/2014 |
| KR | 10-1690040 B1 | 1/2017 |

OTHER PUBLICATIONS

Written Opinion dated Sep. 5, 2018 issued by the International Searching Authority in counterpart International Application No. PCT/KR2018/006682 (PCT/ISA/237).

* cited by examiner (a)

| | POWER STATE OF DISPLAY | TIME ZONE | PERIPHERAL ILLUMINATION OF ELECTRONIC APPARATUS | ILLUMINATION SENSOR | ILLUMINATION VALUE | PATTERN |
|---|---|---|---|---|---|---|
| FIRST CONDITION | ON | DAYTIME | BRIGHT | | | |
| SECOND CONDITION | ON | NIGHTTIME | BRIGHT | | | |
| THIRD CONDITION | OFF | DAYTIME | BRIGHT | | | |
| FOURTH CONDITION | OFF | NIGHTTIME | DARK | | | |

ELECTRONIC APPARATUS INCLUDING DISPLAY PANEL CONFIGURED TO TURN ON AND OFF USING AN ILLUMINATION SENSOR, METHOD AND COMPUTER-READABLE RECORDING MEDIUM

CROSS-REFERENCE TO RELATED APPLICATION

This application is based on and claims priority under 35 U.S.C. § 119 to Korean Patent Application No. 10-2017-0124393, filed on Sep. 26, 2017, in the Korean Intellectual Property Office, the disclosure of which is incorporated by reference herein in its entirety.

BACKGROUND

1. Field

The disclosure relates to an electronic apparatus, a method for controlling the same, and an electronic apparatus which is capable of controlling an operation of an electronic apparatus by using a peripheral illumination value, a method for controlling the same, and a computer-readable recording medium.

2. Description of Related Art

A switch at the bottom end of the bezel of the electronic apparatus may be used to turn on or off a power of the display.

Also, a change of illumination of the illumination sensor may control a power of the display even if the switch is not pressed.

However, when the illumination sensor is used, a power control is carried out as the illumination value is changed. Thus, when a person passes by the illumination sensor or when an object is placed and a shadow occurs near the illumination sensor, there is a problem that an unintended power control may occur.

In addition, an electronic device may not properly operate in a dark environment when the illumination sensor is used. In more detail, when the illumination sensor is used and the user's manipulation is determined according to a change of the illumination value, the illumination may not change even when the user touches or manipulates the vicinity of the illumination sensor in the dark environment.

SUMMARY

An aspect of various embodiments of the present disclosure is to provide an electronic apparatus which is capable of controlling an operation of an electronic apparatus by using a peripheral illumination value, and a method for controlling an operation of the electronic apparatus.

According to an aspect of the disclosure, there is provided an electronic apparatus, including: a display; an illumination sensor; and a processor configured to control an operation of the electronic apparatus according to an illumination value sensed by the illumination sensor, the processor being further configured to carry out a predetermined operation based on the illumination value being greater than or equal to a first threshold, falling below the first threshold for a predetermined time and thereafter being greater than or equal to the first threshold while the display is on, turn on the display based on the illumination value being greater than or equal to the first threshold, falling below the first threshold for the predetermined time and thereafter being greater than or equal to the first threshold while the display is off, and turn on the display based on the illumination value being less than or equal to a second threshold, rising above the second threshold for the predetermined time, and thereafter being less than or equal to the second threshold, the second threshold being less than the first threshold while the display is off.

The processor may be further configured to carry out the predetermined operation based on a first pattern being repeated at least twice while the display is on, the first pattern being: the illumination value being less than or equal to the second threshold, rising above the second threshold for the predetermined time and thereafter being less than or equal to the second threshold.

The processor may be further configured to, in a state in which the display of the electronic apparatus is off, distinguish between a first pattern where the illumination value is greater than or equal to the first threshold, falls below the first threshold for the predetermined time and is thereafter greater than or equal to the first threshold, and a second pattern where the illumination value is less than or equal to the second threshold, rises above the second threshold for the predetermined time and is thereafter less than or equal to the second threshold, and turn on the display based on a same type of pattern being repeated at least twice.

The first threshold may be a minimum value from among an average of illumination values sensed while a peripheral illumination of the electronic apparatus is bright and an average of illumination values sensed while the peripheral illumination of the electronic apparatus is dark and the display of the electronic apparatus is on, the second threshold may be an average of illumination values sensed while the peripheral illumination of the electronic apparatus is dark and the display of the electronic apparatus is off, and each of the first threshold and the second threshold may be modifiable according to a use environment of the electronic apparatus.

The predetermined operation may be an operation to turn off the display of the electronic apparatus.

The processor may be further configured to, in a state in which the display of the electronic apparatus is on, based on the illumination value being greater than or equal to the first threshold, falling below the first threshold for the predetermined time and thereafter being greater than or equal to the first threshold, display at least one menu, and carry out an operation based on a selection corresponding to the at least one displayed menu.

The processor may be further configured to display a cursor on the at least one menu, and sequentially move the cursor every time the illumination value is greater than or equal to the first threshold, falls below the first threshold for the predetermined time, and is thereafter greater than or equal to the first threshold.

The processor may be further configured to, in a state in which the cursor is displayed on one menu, based on the illumination value being greater than or equal to the first threshold and falling below the first threshold for the predetermined time or longer, carry out an operation corresponding to the one menu on which the cursor is displayed.

The electronic apparatus may further include: a light configured to emit light while the display of the electronic apparatus is off, and the light and the illumination sensor may be adjacent to each other.

In accordance with another aspect of the disclosure, there is provided a method for controlling an operation of an electronic apparatus including a display and an illumination sensor, the method including: detecting an illumination value using the illumination sensor provided in the electronic apparatus; carrying out a predetermined operation based on the illumination value being greater than or equal to a first threshold, falling below the first threshold for a predetermined time and thereafter being greater than or equal to the first threshold while the display is on; turning on the display based on the illumination value being greater than or equal to the first threshold, falling below the first threshold for the predetermined time and thereafter being greater than or equal to the first threshold while the display is off; and turning on the display based on the illumination value being less than or equal to a second threshold, rising above the second threshold for the predetermined time and thereafter being less than or equal to the second threshold, the second threshold being less than the first threshold while the display is off.

The predetermined operation may be carried out based on a first pattern being repeated at least twice while the display is on, and the first pattern may be: the illumination value being greater than or equal to the first threshold, falling below the first threshold for the predetermined time, and thereafter being greater than or equal to the first threshold.

The turning on the display may include distinguishing between a first pattern where the illumination value is greater than or equal to the first threshold, falls below the first threshold for the predetermined time and is thereafter greater than or equal to the first threshold, and a second pattern where the illumination value is less than or equal to the second threshold, rises above the second threshold for the predetermined time and is thereafter less than or equal to the second threshold, and turning on the display based on a same type of pattern being repeated at least twice.

The first threshold may be a minimum value from among an average of illumination values sensed while a peripheral illumination of the electronic apparatus is bright and an average of illumination values sensed while the peripheral illumination of the electronic apparatus is dark and the display of the electronic apparatus is on, the second threshold may be an average of illumination values sensed while the peripheral illumination of the electronic apparatus is dark and the display of the electronic apparatus is off, and each of the first threshold and the second threshold may be modifiable according to a use environment of the electronic apparatus.

The predetermined operation may be an operation to turn off a display of the electronic apparatus.

The carrying out the predetermined operation may include, in a state in which the electronic apparatus is on, based on the illumination value being greater than or equal to the first threshold, falling below the first threshold for the predetermined time and thereafter being greater than or equal to the first threshold, displaying at least one menu, and carrying out an operation based on a selection corresponding to the at least one displayed menu.

The carrying out the predetermined operation may further include displaying a cursor on the at least one menu, and sequentially moving the cursor every time the illumination value is greater than or equal to the first threshold, falls below the first threshold for the predetermined time, and is thereafter greater than or equal to the first threshold.

The carrying out the operation corresponding to the selected menu may include, in a state in which the cursor is displayed on one menu, based on the illumination value being greater than or equal to the first threshold, and falling below the first threshold for the predetermined time, carrying out an operation corresponding to the one menu on which the cursor is displayed.

The method may further include: emitting light, by a light of the electronic apparatus, while the display of the electronic apparatus is off, and the detecting the illumination value may include detecting light emitted from the light.

In accordance with yet another aspect of the disclosure, there is provided a non-transitory computer-readable medium which stores one or more instructions to control an electronic apparatus including a processor, a display and an illumination sensor to carry out an operation when executed by the processor of the electronic apparatus, the operation including: detecting an illumination value of using the illumination sensor provided in the electronic apparatus; carrying out a predetermined operation based on the illumination value being greater than or equal to a first threshold, falling below the first threshold for at least a predetermined time, and thereafter being greater than or equal to the first threshold while the display is on; turning on the display based on the illumination value being greater than or equal to the first threshold, falling below the first threshold for the predetermined time and thereafter being greater than or equal to the first threshold while the display is off; and turning on the display based on the illumination value being less than or equal to a second threshold, rising above the second threshold for the predetermined time and thereafter being less than or equal to the second threshold, the second threshold being less than the first threshold while the display is off.

BRIEF DESCRIPTION OF THE DRAWINGS

The above and other aspects, features and advantages of certain embodiments of the present disclosure will be more apparent from the following description taken in conjunction with the accompanying drawings, in which:

FIG. 11 is a diagram illustrating a pattern of illumination values measured by the illumination sensor according to a power state of the display and a time;

DETAILED DESCRIPTION

Figure 1:
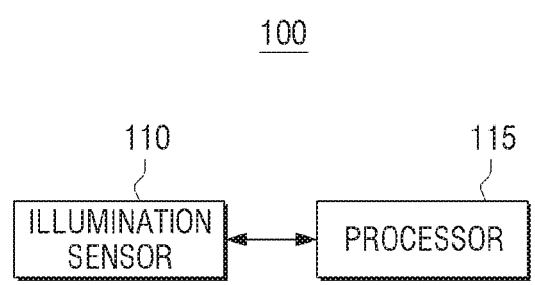
FIG. 1 is a diagram illustrating an electronic apparatus, according to an embodiment.

Before specifically describing the present disclosure, a method for demonstrating the present specification and drawings will be described.

First of all, the terms used in the present specification and the claims are general terms selected in consideration of the functions of the various embodiments of the present disclosure. However, these terms may vary depending on intention, legal or technical interpretation, emergence of new technologies, and the like of those skilled in the related art. Also, there may be some terms arbitrarily selected by an applicant. Unless there is a specific definition of a term, the term may be construed based on the overall contents and technological common sense of those skilled in the related art.

Also, the same reference numerals or symbols described in the attached drawings denote parts or elements that actually perform the same functions. For convenience of descriptions and understanding, the same reference numerals or symbols are used and described in different embodiments. In other words, although elements having the same reference numerals are all illustrated in a plurality of drawings, the plurality of drawings do not mean one embodiment.

Further, the terms including numerical expressions such as a first, a second, and the like may be used to explain various components, but there is no limitation thereto. The ordinal numbers are used in order to distinguish the same or similar elements from one another, and the use of the ordinal number should not be understood as limiting the meaning of the terms. For example, used orders, arrangement orders, or the like of elements that are combined with these ordinal numbers may not be limited by the numbers. The respective ordinal numbers are interchangeably used, if necessary.

The singular expression also includes the plural meaning as long as it does not differently mean in the context. The terms "include", "comprise", "is configured to," etc., of the description are used to indicate that there are features, numbers, steps, operations, elements, parts or combination thereof, and they should not exclude the possibilities of combination or addition of one or more features, numbers, steps, operations, elements, parts or a combination thereof.

The embodiments may have a variety of modifications and several embodiments. Accordingly, specific embodiments will be illustrated in the drawings and described in detail in the detailed description part. However, this does not necessarily limit the scope of the embodiments to a specific embodiment form. Instead, modifications, equivalents and replacements included in the disclosed concept and technical scope of this specification may be employed. While describing embodiments, if it is determined that the specific description regarding a known technology obscures the gist of the disclosure, the specific description is omitted.

In the present disclosure, relational terms such as first and second, and the like, may be used to distinguish one entity from another entity, without necessarily implying any actual relationship or order between such entities. Expressions such as "at least one of" when preceding a list of elements, modify the entire list of elements and do not modify the individual elements of the list. For example, the expression, "at least one of a, b, and c," should be understood as including only a, only b, only c, both a and b, both a and c, both b and c, or all of a, b, and c.

The terms used herein are solely intended to explain a specific embodiment, and not to limit the scope of the present disclosure. It is to be understood that the singular forms "a," "an," and "the" include plural referents unless the context clearly dictates otherwise. The terms "include", "comprise", "is configured to," etc., of the description are used to indicate that there are features, numbers, steps, operations, elements, parts or combination thereof, and they should not exclude the possibilities of combination or addition of one or more features, numbers, steps, operations, elements, parts or a combination thereof.

The term such as "module," "unit," "part", and so on is used to refer to an element that performs at least one function or operation, and such element may be implemented as hardware or software, or a combination of hardware and software. Further, except for when each of a plurality of "modules", "units", "parts", and the like needs to be realized in an individual hardware, the components may be integrated in at least one module or chip and be realized in at least one processor.

Also, when any part is connected to another part, this includes a direct connection and an indirect connection through another medium. Further, when a certain portion includes a certain element, unless specified to the contrary, this means that another element may be additionally included, rather than precluding another element.

FIG. 1 is a diagram illustrating an electronic apparatus, according to an embodiment.

Referring to FIG. 1, the electronic apparatus 100 may include the illumination sensor 110 and a processor 115.

The electronic apparatus 100 may be a TV, a monitor, a tablet, a smartphone, and the like, and may be any device which includes a display, in addition to the devices described above.

The illumination sensor 110 is a sensor for measuring brightness. In more detail, the illumination sensor 110 is disposed at a predetermined position of the display apparatus, and detects a change of brightness within a specific area of the display apparatus. Although it is described above that a brightness is measured using the illumination sensor 110, at the time of implementation, other configurations (e.g., a color sensor, a CCD, a CMOS) and the like which are capable of measuring the illumination may be used other than the illumination sensor 110.

The illumination sensor 110 may measure illumination even when a power of the display of the electronic apparatus 100 is turned off. When a plug is connected to a socket, some power is supplied to the electronic apparatus 100 and thus, even if the power of the display is turned off, the illumination sensor 110 may measure a peripheral illumination.

In addition, when a user's finger approaches in the vicinity of the lighting part, a light sent from the lighting part may be reflected from the finger. This reflected light may be measured by the illumination sensor 110 to measure the illumination value.

In addition, other than the light emitted from the lighting part, the light reflected by an external light source may be measured by the illumination sensor 110. For example, in the day time, when a finger approaches, the illumination sensor 110 may measure a light emitted from the lighting part and a light by the external light source.

The illumination sensor 110 serves to detect light and thus, it may be difficult to determine whether or not the user changes the illumination value to control an operation of the electronic apparatus 100. For example, it cannot be determined whether the illumination value is changed due to a behavior that the user simply passes by the vicinity of the illumination sensor 110. Accordingly, the processor 115 determines whether or not a behavior is intended by a user based on a measured value of the illumination sensor 110.

In a state in which the illumination sensor 110 is disposed toward a front surface, when a person passes by from the front surface direction of the electronic apparatus 100, an illumination value measured by the illumination sensor 110 may be rapidly changed, and this may be a cause of malfunction. Accordingly, the illumination sensor 110 may be disposed at a bottom end portion of the electronic apparatus 100 to prevent an exceptional situation in which a malfunction occurs.

For example, in a case in which the illumination sensor 110 faces toward the bottom end, the illumination value measured by the illumination sensor 110 may not be rapidly changed even if a person or an animal passes by the electronic apparatus 100. In addition, it is necessary that the lighting part sends light toward a lower direction as well, so that when the user's finger approaches, the light of the lighting part is reflected and the illumination sensor 110 may measure the reflected light.

However, the illumination sensor 110 and the lighting part are disposed at the bottom end portion, and the illumination sensor 110 may be disposed at any portion of the electronic apparatus 100.

Figure 7:
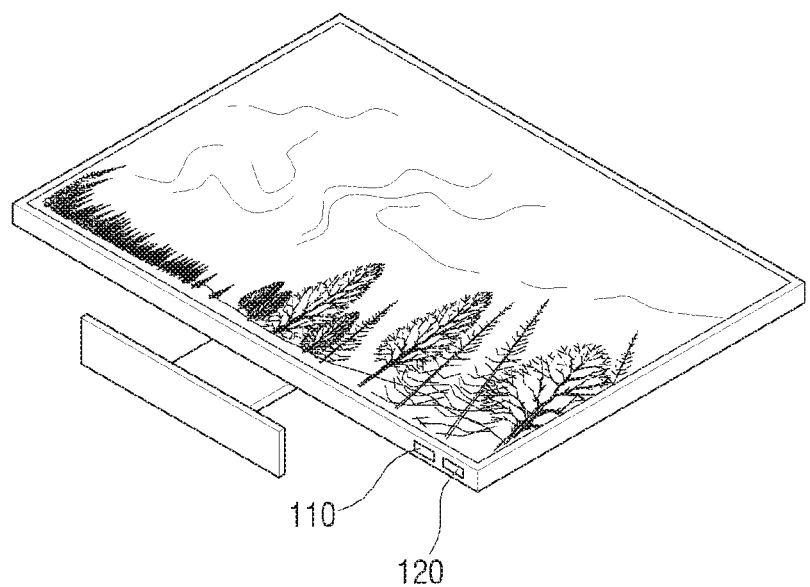
FIG. 7 is a diagram illustrating a detailed disposition of the illumination sensor and a lighting part.

Meanwhile, the illumination sensor 110 may be disposed as being adjacent to the bottom end portion of the electronic apparatus 100 as illustrated in FIG. 7 which will be described later. However, the disposition is not limited thereto, and the illumination sensor 110 may be configured in various dispositions in which the illumination sensor 110 can measure the illumination value.

The processor 115 may control the overall operation of the electronic apparatus 100, and may include a processor 115, such as a central processing unit (CPU) and the like. The processor 115 may control an operation of the electronic apparatus 100 according to the illumination value of the illumination sensor 110. The processor 115 may carry out an operation for displaying a particular menu but also an operation of controlling power and an operation of changing a power status, such as a power save mode and the like. In addition, the processor 115 may store elements preset by the user in advance.

In addition, the processor 115 may, in a state that a display of the electronic apparatus 100 is turned on, when the illumination value of the illumination sensor 110 is detected to be greater than or equal to a first threshold, descends for a predetermined time, and returns, carry out a predetermined operation. The processor 115 may, in a state that a display of the electronic apparatus 100 is turned off, when the illumination value of the illumination sensor 110 is detected to be greater than or equal to a first threshold, descends for a predetermined time, and returns, or when the illumination value of the illumination sensor 110 is detected to be less than or equal to a second threshold lower than the first threshold, ascends, and returns, control to carry out an operation of turning on the display.

In addition, the processor 115 may recognize that the illumination value of the illumination sensor 110 is, in a state that a display of the electronic apparatus 100 is turned on, detected to be greater than or equal to a first threshold, descends for a predetermined time, and returns as one pattern. When the same type of patterns is repeated at least twice, the processor 115 may control the electronic apparatus 100 to carry out a predetermined operation.

In addition, the processor 115 may, in a state that the display of the electronic apparatus 100 is turned off, when the illumination value of the illumination sensor 110 is detected to be greater than or equal to a first threshold, descends for a predetermined time, and returns, or when the illumination value of the illumination sensor 110 is detected to be less than or equal to a second threshold lower than the first threshold, ascends for a predetermined time, and returns, recognize the two conditions as different patterns. In addition, when the same type of patterns is repeated at least twice, the processor 115 may carry out an operation of turning on the display.

In addition, the processor 115 may carry out an operation of turning off the display of the electronic apparatus 100 in response to a predetermined operation. The processor 115 may, in a state in which the electronic apparatus 100 is turned on, when the illumination value of the illumination sensor 110 is detected to be greater than or equal to the first threshold, descends for a predetermined time, and returns, display at least one menu, and when one of the displayed menus is selected, carry out an operation corresponding to the selected menu.

In addition, the processor 115 may display a cursor on at least one menu, and every time when a sensing pattern that the illumination value of the illumination sensor 110 is detected to be greater than or equal to a first threshold, descends for a predetermined time, and returns is detected, sequentially move the cursor displayed on the menu.

In addition, the processor 115 may, in a state in which a cursor is displayed on a menu, when a sensing pattern that the illumination value of the illumination sensor 110 is detected to be greater than or equal to the first threshold and descends for a predetermined time or longer is detected, choose to carry out an operation corresponding to the menu on which the cursor is displayed.

In addition, the processor 115 may store a time 905, 1005 preset by a user, a threshold 910, 1010, the illumination value change width 920, 1020, and the like in the storage 150 in advance, and change them by a user input.

The time 905, 1005 preset by the user, the threshold 910, 1010, the illumination value change width 920, 1020, and the like may be used to determine whether an operation of the processor 115 is intended by the user. In more detail, in a case of the illumination value which is increased for a shorter time period than the preset time 905, 1005, it may be determined by a change of illumination value due to other external factor, not by an operation of the user.

The first threshold 910 may be a minimum value from among an average of illumination values sensed when a peripheral illumination of the electronic apparatus 100 is bright and an average of illumination values sensed when a peripheral illumination of the electronic apparatus 100 is dark and the display of the electronic apparatus 100 is turned on.

In addition, the processor 115 may set a value less than a minimum value from among an average of illumination values sensed when a peripheral illumination of the electronic apparatus 100 is bright and an average of illumination values sensed when a peripheral illumination of the electronic apparatus 100 is dark and the display of the electronic apparatus 100 is turned on as a first threshold 910. The reason why the minimum value from among the compared values described above is set as the first threshold 910 is to determine whether the illumination value is detected to be greater than or equal to the first threshold.

When the first threshold 910 is set, an operation of the electronic apparatus 100 may be controlled only when the first threshold 910 is greater than or equal to a predetermined illumination value. The processor 115 may distinguish a situation not intended by the user through a threshold. In addition, when the first threshold 910 is set low, the processor 115 may control an operation of the electronic apparatus 100 regardless of the illumination value measured first.

The first threshold 910 may be changed according to a use environment of the electronic apparatus 100 and may be directly input by the user. In a case in which a pattern that the illumination sensor 110 is maintained constantly, descends, and returns is shown, it may be determined that the user has carried out an operation of controlling the electronic apparatus 100.

In addition, the illumination sensor 110 may determine whether a peripheral illumination of the electronic apparatus 100 is in a bright state or in a dark state by a particular predetermined value. In FIG. 11, it is displayed that a peripheral illumination of the electronic apparatus 100 is dark only when the power status of the display is off and when it is night time. However, the determination of the peripheral illumination of the electronic apparatus 100 may be changed by a particular predetermined value set by the user.

The second threshold 1010 may be an average of illumination values which are sensed when the peripheral illumination of the electronic apparatus 100 is dark and all displays of the electronic apparatus 100 are turned off.

In addition, the second threshold 1010 may be a value greater than an average of illumination values which are sensed when the peripheral illumination of the electronic apparatus 100 is dark and all displays of the electronic apparatus 100 are turned off. The reason why the second threshold 1010 is set as a larger value from among the compared values described above is to determine whether the illumination value is detected to be less than or equal to the second threshold 1010.

When the second threshold 1010 is set, an operation of the electronic apparatus 100 may be controlled only when the first threshold 910 is greater than or equal to a predetermined illumination value, and a situation not intended by the user may be distinguished through a threshold. In this regard, when the first threshold is set low, the processor 115 may control an operation of the electronic apparatus 100 regardless of the illumination value measured first.

The second threshold 1010 may be changed according to a use environment of the electronic apparatus 100. In a case in which a pattern that the illumination sensor 110 is maintained constantly, ascends, and returns is shown, it may be determined that the user has carried out an operation of controlling the electronic apparatus 100.

In this regard, setting the first threshold 910 and the second threshold 1010 may be such that the processor 115 does not judge that a change of illumination value not intended by the user is a user command.

For example, even in a case where a brightness of a TV screen is changed or an intensity of external light is changed regardless of a user's intention, a pattern that the illumination value descends and returns may be shown. Accordingly, the first threshold 910 and the second threshold 1010 may be set to prevent a problem that the electronic apparatus 100 is operated due to an exceptional situation can be prevented as much as possible.

In addition, in a case in which the illumination value between the first threshold 910 and the second threshold 1010 is detected, it may be determined that the situation is a state not intended by the user.

In addition, in another embodiment, a particular threshold may correspond to an average of illumination values measured by the illumination sensor 110 for a predetermined time. The illumination value measured by the illumination sensor 110 for a predetermined time without an operation of comparing illumination values in different situations may be set as a particular threshold. The first threshold and the second threshold may be set as being larger than or less than the measured average, and when a range of the currently measured illumination value is recognized and the illumination value exceeds a predetermined range, the processor 115 may determine that a user's control command is present.

In addition, the first threshold 910 and the second threshold 1010 may be determined without determining whether a peripheral illumination of the electronic apparatus 100 is bright or dark. In more detail, the first threshold 910 and the second threshold 1010 may correspond to a particular value which is determined through a plurality of experiment examples. The action that the user's finger approaches may be defined as a user motion. The user motion may refer to an operation attempting to control the electronic apparatus 100, and may be an action of approaching the finger.

Meanwhile, the processor 140 may determine any action that may change the illumination value measured by the illumination sensor 110 as a user motion.

A particular value determined through a plurality of experiment examples may be generated by storing whether the illumination value is ascended or descended by a user motion as data and then, setting the minimum illumination value from among illumination values in cases where a change of illumination value is descended as the first threshold 910. In addition, the maximum illumination value from among illumination values in cases where a change of illumination value is ascended may be set as the second threshold 1010. When the illumination value of greater than or equal to the first threshold 910 is detected, the illumination value may be descended by a user motion, and when the illumination value of less than or equal to the second threshold 1010 is detected, the illumination value may be ascended by a user motion. When the illumination value between the first threshold 910 and the second threshold 1010 is detected, the electronic apparatus 100 may not carry out any operation.

In addition, for the first threshold 910 and the second threshold 1010, a value determined by the user to be appropriate to determine the illumination value corresponding to a user command may be selected after a plurality of data are analyzed. For such operation, the electronic apparatus 100 may further include a user interface.

Meanwhile, the processor 115 may control an operation of the electronic apparatus 100 by calculating a change rate of the previous illumination value in addition to the time 905, 1005, the threshold value 910, 1010 and the illumination value change width 920, 1020.

For example, the processor 115 may, while the previous illumination value is maintained constantly, when a change that exceeds a predetermined ratio of the previous illumination value is detected, control to immediately carry out a particular operation. A user may set a predetermined ratio to detect a change that exceeds the predetermined ratio. In a case in which the previous illumination value maintains 1000, while a change ratio of the illumination value is set to be 30%, when the illumination value is out of range 700 to 1300, it may be determined that a user's operation command is present.

Meanwhile, the electronic apparatus 100 may further include a user interface for the user to input a time 905, 1005, a threshold 910, 1010, and the illumination value change width 920, 1020.

According to another embodiment, the electronic apparatus 100 may include a plurality of processors 115. In more detail, the electronic apparatus 100 may include a first processor (main processor) controlling the other operations of the electronic apparatus 100 after a power of the display 140 is turned on and a second processor (sub processor, sub micom) controlling an operation of the illumination sensor 110 and the lighting part 120 even when the power of the display 140 is turned off.

In addition, a state in which a power is supplied to the processor 115 of the electronic apparatus 100 and the power of the display 140 is turned on may be referred to as a normal mode, and a state in which the power is supplied to the processor 115 of the electronic apparatus 100 and the power of the display is turned off may be referred to as a standby mode. When the electronic apparatus 100 is in a normal mode, an operation of the electronic apparatus 100 may be controlled through the first processor. The power may be supplied to both the first processor and the second processor.

When the electronic apparatus 100 is in a standby mode, the power may not be supplied to the first processor and the power may be supplied to the second processor only. In other words, in the standby mode in which the display 140 of the electronic apparatus 100 is turned off, the electronic apparatus 100 may be operated through the second processor instead of the first processor. In more detail, in the standby mode, the power may not be supplied to the first processor and the power may be supplied to only the second processor. The second processor may control a light to be emitted from the lighting part 120 and control the illumination sensor 110 to measure an ambient illumination.

In the case where a power is not supplied to the electronic apparatus 100, the electronic apparatus 100 may include an additional temporary power supply apparatus. For example, an internal battery may be provided in the electronic apparatus 100. The power may be supplied through the internal memory, which is a temporary power supply apparatus, even when the power is not supplied to the electronic apparatus 100.

In addition, a temporary power supply apparatus may supply power to the second processor in the standby mode. For example, in a state that the power supply to the first processor is blocked, a temporary power supply apparatus (e.g., internal memory) may be used to control the second processor. The temporary power supply apparatus may supply power to the second processor in the standby mode.

Since the power is supplied to the second processor in the standby mode as well, the electronic apparatus 100 may measure a change of an ambient illumination and carry out an operation corresponding to the change of illumination value even when the display 140 is turned off.

As another embodiment, the processor 115 may also immediately determine a change of illumination value without setting the above-described threshold 910, 1010 and control the electronic apparatus 100. The processor 115 may, without going through an operation of determining a threshold, immediately measure a change of illumination value measured by the illumination sensor 110 and control the electronic apparatus 100.

Referring to FIG. 1 as described above, a light emitted from the lighting part is reflected even when an ambient illumination of the electronic apparatus 100 is dark, and thus, the illumination sensor 110 may measure a change of illumination value. For example, even in a situation where an internal lighting is not turned on in the night time, the user may see the light emitted from the lighting part, and if the user approaches a finger, the illumination value may be changed. The processor 115 may control an operation of the electronic apparatus 100 based on the amount of change of illumination value.

Referring to FIG. 1, the user may store a predetermined time 905, 1005, a threshold 910, 1010, the illumination value change width 920, 1020, and the like in advance, and control an operation of the electronic apparatus 100 only when a particular condition is met. Through these conditions, the processor 115 may determine various exceptional situations not intended by the user.

For example, it may be determined that the illumination value is changed due to an action of passing by the electronic apparatus 100 or an action of suddenly turning on an internal light and the like is not to control an operation of the electronic apparatus 100. Accordingly, the processor 115 may store a predetermined time 905, 1005, a threshold 910, 1010, the illumination value change width 920, 1020, and the like in advance, control an operation of the electronic apparatus 100 only when a particular condition is met, and determine exceptional situations.

Figure 2:
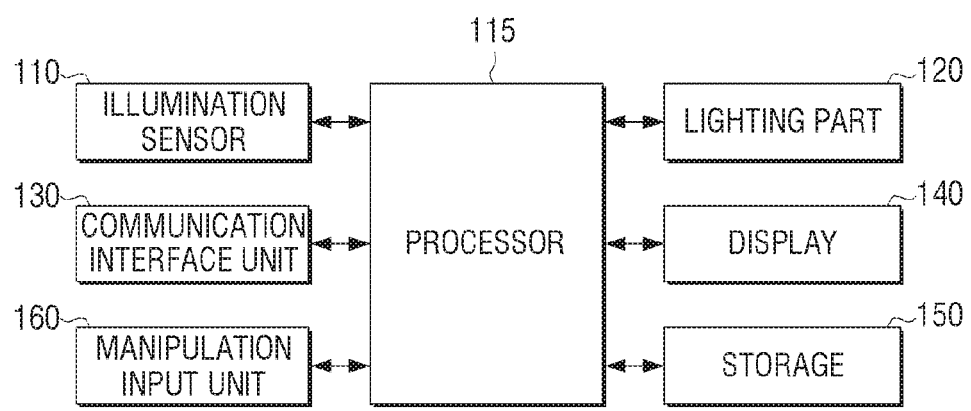
FIG. 2 is a diagram illustrating a detailed configuration of an electronic apparatus of FIG. 1.

FIG. 2 is a diagram illustrating a specific configuration of an electronic apparatus 100 of FIG. 1.

Referring to FIG. 2, the electronic apparatus 100 may include, in addition to the illumination sensor 110 and a processor 115, a lighting part 120, a communication interface unit 130, a display 140, and a storage 150.

Since the operations of the illumination sensor 110 and the processor 115 have been described above with reference to FIG. 1, an overlapped description will be omitted.

The lighting part 120 emits light. In more detail, the lighting part 120 may include a light emitting diode (LED), and may emit light to a predetermined area. Although it is described above that a light emitting diode is used, in embodiments, another element capable of emitting light other than the light emitting diode may be used.

In addition, the lighting part 120 selectively emits light according to an operation state of the electronic apparatus 100. In more detail, when the electronic apparatus 100 is turned on and operated, the lighting part 120 may emit light and display that the electronic apparatus 100 is in an operating state. When the electronic apparatus 100 is in a turn-off state, the lighting part 120 may not emit light and display that the electronic apparatus 100 is not in an operating state.

In addition, the lighting part 120 may selectively emit light according to an amount of light measured by the illumination sensor 110. In more detail, the lighting part 120 may not emit light when a surrounding environment is bright or when the display 140 of the electronic apparatus 100 is in a turn-on state. In addition, the lighting part 120 may emit light even when an ambient environment is dark or when the display is in a turn-off state.

For example, when light is emitted from the lighting part 120, the light is reflected from the user's finger and the illumination sensor 110 measures the reflected light, and the period in which it is necessary for the light of the lighting part 120 to be emitted may be a state in which a surrounding area is dark enough to detect the reflected light. When the surrounding area is bright, a value measured by reflecting the light emitted through the lighting part 120 is larger than a value measured by an ambient light source and thus, the light of the lighting part 120 may not be necessary. Accordingly, the lighting part 120 may emit light when a surrounding environment is dark and when the display 140 of the power supply apparatus is turned off.

When the light emitted from the lighting part 120 is reflected from the user's finger or an object, the illumination sensor 110 may measure the light.

In addition, in a case in which an ambient illumination is dark and a power of the display 140 is turned off, the light of the lighting part 120 enters and thus, the user may know to which part the user has to approach his or her finger through the light of the lighting part 120.

In addition, the lighting part 120 may emit light in a state in which the display 140 of the electronic apparatus 100 is turned off, and may have a structure in which the lighting part 120 and the illumination sensor 110 are adjacently disposed so that a light emitted from the lighting part is detected by the illumination sensor 110.

When the light emitted from the lighting part 120 is reflected from the user's finger, the illumination sensor 110 may measure the light. When the lighting part 120 and the illumination sensor 110 are adjacently disposed, the illumination sensor 110 may easily measure the light emitted from the lighting part 120. In addition, the processor 115 may clearly identify a pattern that ascends or descends and then, returns, to determine an operation corresponding to a user command. That is, if the lighting part 120 and the illumination sensor 110 is adjacently disposed, the processor 115 may clearly identify an amount of change of illumination in a state in which an ambient illumination is dark and the display of the electronic apparatus 100 is turned off.

The communication interface unit 130 may serve to receive data related to a content or to transmit particular data. The communication interface unit 130 is provided to perform communication with various types of external devices according to various types of communication methods. The communicator may be connected to an external device via a near field communication network (Local Area Network: LAN) or the Internet network, and may be connected to an external device via wireless communication technology (e.g., Z-wave, 4LoWPAN, RFID, LTE D2D, BLE, GPRS, Weightless, Edge Zigbee, ANT+, NFC, IrDA, DECT, WLAN, Bluetooth, Wi-Fi, Wi-Fi Direct, Global System for Mobile Communications (GSM), Universal Mobile Telecommunications System (UMTS), Long Term Evolution (LTE), Wireless Broadband (WiBRO) and the like). The communicator may include a WiFi chip, a Bluetooth® chip, an NFC chip, and a wireless communication chip. The WiFi chip, the Bluetooth® chip and the NFC chip respectively perform communication according to WiFi method, Bluetooth® method, and NFC method.

The display 140 may refer to a panel which displays a content. The display 140 may display a menu on the electronic apparatus 100. The functions included in the menu may be a function of turning off a power of the display (TV off), a function of changing a channel number (ch up, ch down), a function of controlling volume (vol up, vol down), a function of determining an external input (source), and a function of ending a menu (exit). In addition, a group 1210 of the menu may be displayed in a horizontal form on the display 140.

The display 140 may display a user interface window for receiving an input of a user control command. The display 140 may be implemented as various types of displays, such as an LCD (Liquid Crystal Display), an OLED (Organic Light Emitting Diodes) display, a PDP (Plasma Display Panel), and a touch screen.

The storage 150 may be connected to each of the processors 115 and store various data and user settings. The storage 150 may be implemented to be non-volatile memory, volatile memory, flash memory, hard disk drive (HDD) or solid state drive (SSD). The storage 150 may be implemented not only as a storage medium in the electronic apparatus but also as an external storage medium such as a micro SD card, a USB memory or a Web server through a network.

The manipulation input unit 160 may correspond to an element which receives an input of a user control command. The illumination sensor and the like may be an element of the manipulation input unit 160. For example, the illumination sensor may detect a change of illumination caused by a particular action of the user, and when a change of illumination is detected, control a power of the electronic apparatus 100.

The manipulation input unit 160 may be implemented to be device such as button, touch pad, mouse and keyboard, or may be implemented to be touch screen that can also perform the displaying function and the manipulation input function.

Figure 3:
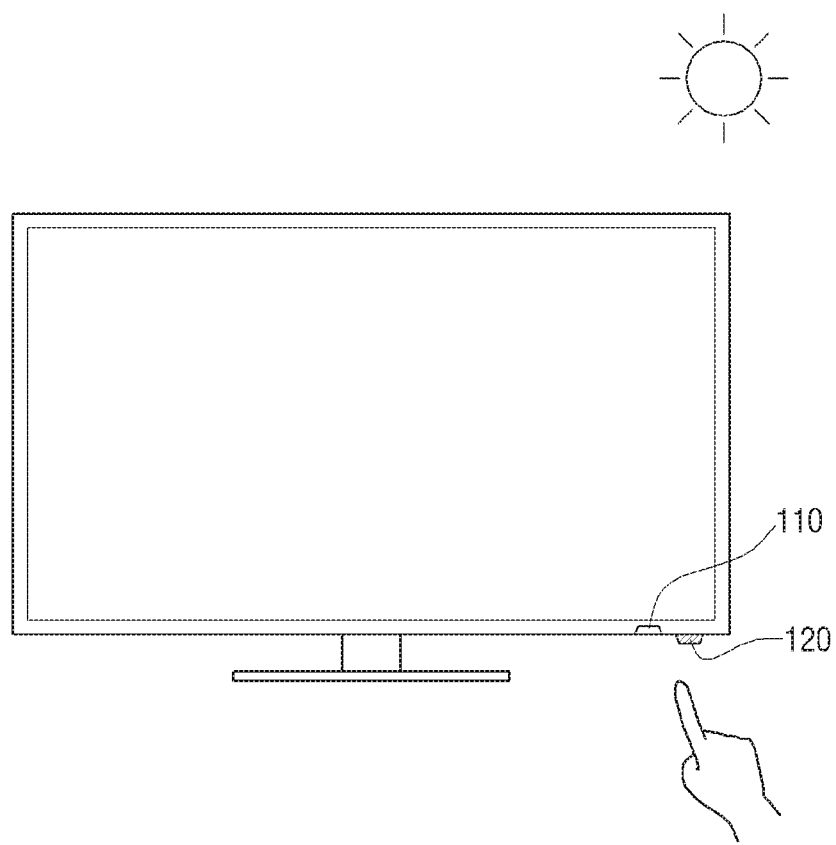
FIG. 3 is a diagram illustrating an operation of an electronic apparatus when a surrounding environment is bright, according to an embodiment.

FIG. 3 is a diagram illustrating an operation of an electronic apparatus 100 when a surrounding environment is bright, according to an embodiment.

Referring to FIG. 3, a case in which an ambient illumination of the electronic apparatus 100 is bright may refer to a case in which the sun shines in the daytime and a case in which an indoor fluorescent light is turned off. In a case in which an ambient illumination of the electronic apparatus 100 is bright, when the user approaches his or her finger, the light emitted from the lighting part 120 is reflected from the finger, the reflected light may be measured by the illumination sensor 110, and the entire light emitted from an external source may be measured by the illumination sensor 110. The light emitted from the external source may be a natural light (e.g., sunlight) or an artificial light emitted from a light emitting apparatus. The electronic apparatus 100 does not distinguish them and measure illumination using the illumination sensor 110.

Figure 4:
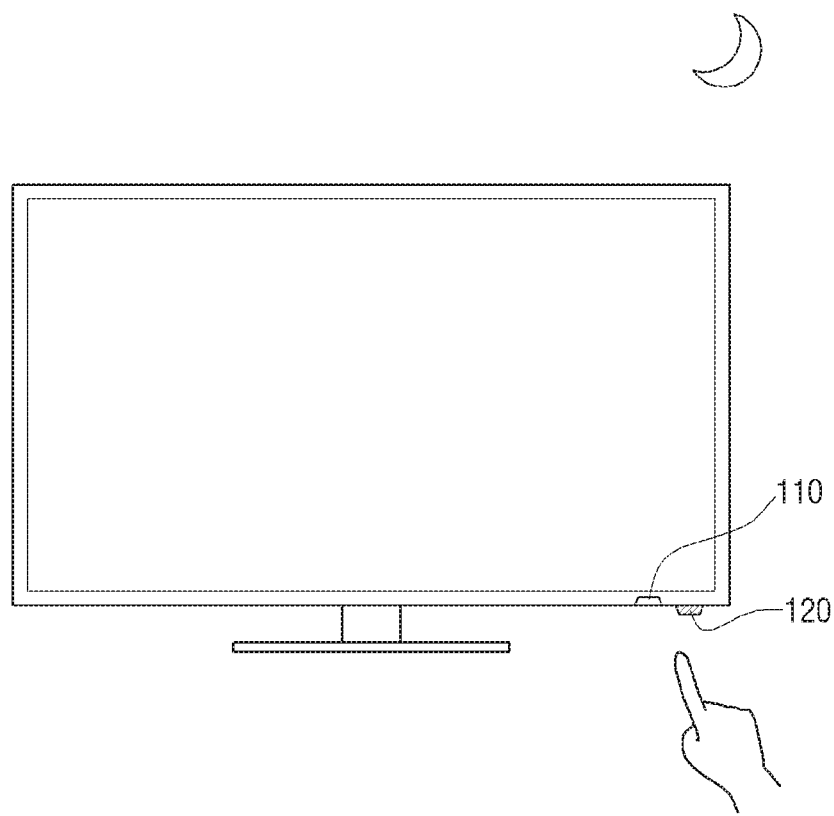
FIG. 4 is a diagram illustrating an operation of an electronic apparatus when a surrounding environment is dark, according to an embodiment.

FIG. 4 is a diagram illustrating an operation of an electronic apparatus 100 when a surrounding environment is bright, according to another embodiment.

Referring to FIG. 4, a case where an ambient illumination of the electronic apparatus 100 is dark may refer to a case where there is no light emitted from an external source. For example, in a case in which a light is not turned on indoors in the nighttime may correspond to a case where an ambient illumination is dark. However, even in the daytime, when the sky is filled with thick clouds or a low illumination value is measured due to the weather, it may be determined that an ambient illumination is dark.

The examples of the daytime and the nighttime are described with reference to FIGS. 3 and 4, but it is not an absolute standard. It may be determined to be a case where an ambient illumination is bright or a case where an ambient is dark by the illumination value measured by the illumination sensor 10 regardless of whether it is the daytime or the nighttime. For example, even in the nighttime, when a light is turned on indoors, the illumination sensor 110 may determine that a peripheral region of the electronic apparatus 100 is bright. In addition, even in the daytime, when the weather is dark or a curtain is installed indoors and thus an external light may be blocked, the illumination sensor 110 may determine that a peripheral area of the electronic apparatus 100 is dark.

Figure 5:
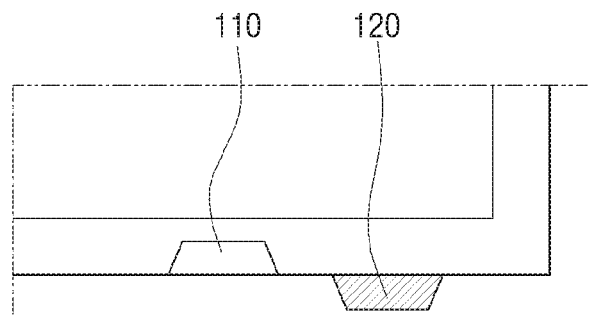
FIG. 5 is a diagram illustrating an example of a first disposition of a lighting part.

FIG. 5 is a diagram illustrating an example of a first disposition of a lighting part 120.

Referring to FIG. 5, the structure may be a disposition structure in which the lighting part 120 is disposed outside. In general, the lighting part 120 may be disposed toward a front surface portion so that a viewer can see the light of the lighting part 120. However, in the present disclosure, it may be disposed such that the light reaches the bottom end portion of the electronic apparatus 100 so that the light of the lighting part 120 is reflected to be measured by the illumination sensor 110. FIG. 5 may refer to a case in which the lighting part 120 is projected from a bezel of the electronic apparatus 100.

In the disposition where the lighting part 120 is projected outward, the light may be sent to both the front surface direction and lower direction of the electronic apparatus 100. In general, the electronic apparatus 100 has a disposition structure where the light is emitted toward only the front side portion so that the user readily identifies whether power is supplied to the electronic apparatus 100. However, the lighting part 120 may be disposed to be projected outward so that the light may be sent to the lower direction.

In addition, the reason why the light is emitted to a lower direction is related to a disposition structure of the illumination sensor 110. In a state in which the illumination sensor 110 is disposed toward a front surface, when a person passes by from the front surface direction of the electronic apparatus 100, the illumination value measured by the illumination sensor 110 may be rapidly changed, and this may be a cause of malfunction. Accordingly, the illumination sensor 110 may be disposed at a bottom end portion of the electronic apparatus 100 to prevent an exceptional situation in which a malfunction occurs.

For example, in a case in which the illumination sensor 110 faces toward the bottom end, the illumination value measured by the illumination sensor 110 may not be rapidly changed even if a person or an animal passes by the electronic apparatus 100. In addition, it is necessary that the lighting part 120 emits light toward a lower direction as well, so that when the user's finger approaches, the light of the lighting part 120 is reflected and the illumination sensor 110 may measure the reflected light. Accordingly, in the present disclosure, the disposition structure of the lighting part 120 emits light in the lower direction.

Figure 6:
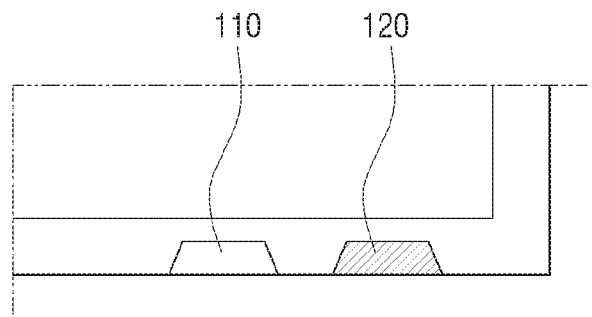
FIG. 6 is a diagram illustrating an example of a second disposition of a lighting part.

FIG. 6 is a diagram illustrating an example of a second disposition of a lighting part.

FIG. 6 is a diagram illustrating a similar disposition to the lighting part 120 illustrated in FIG. 5. As illustrated in FIG. 6, the lighting part 120 may not be protruded outwardly and may be disposed within a bezel. Like FIG. 5, the lighting part 120 may simultaneously emit light in the front surface direction or lower direction of the electronic apparatus 100.

However, unlike FIG. 5, an embodiment of FIG. 6 represents a structure in which the lighting part 120 is not protruded from the bezel but is included in the bezel. As illustrated in FIG. 6, a structure that the lighting part 120 is included in the bezel has the same effect as a disposition in which the lighting part 120 is protruded outwardly and thus, the light may be emitted to the front surface and the lower direction. In addition, a structure as in FIG. 6 may be evaluated as a neat design on the user's side and is a simple structure in manufacturing a bezel and thus, the cost may be reduced. In addition, it is not necessary to consider a protruded portion and thus, the product may have a packaging and other advantages.

FIG. 7 is a diagram illustrating a detailed disposition of the illumination sensor 110 and a lighting part 120.

FIG. 7 may be a structure in which the user is not able to see the light emitted from the lighting part 120 from the front surface direction. Accordingly, the lighting part 120 may be disposed to emit light only in the lower direction.

If the light is not emitted to the front surface direction, as described above, even if a person or an animal passes by toward the front surface direction, a change of illumination value of the illumination sensor 110 may be less affected. Accordingly, through the disposition structure as illustrated in FIG. 7, a change of illumination value not intended by the user can be prevented in advance.

Figure 8:
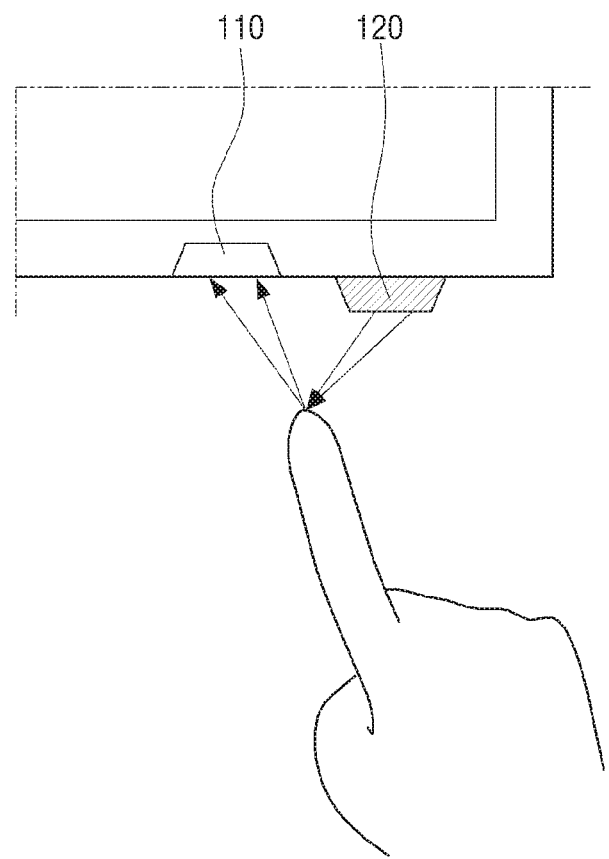
FIG. 8 is a diagram illustrating an operation of a lighting part and the illumination sensor.

FIG. 8 is a diagram illustrating an operation of a lighting part and the illumination sensor 110.

FIG. 8 illustrates that the lighting part 120 emits light to a lower direction. When the user approaches a finger near the lighting part 120, the light emitted from the lighting part 120 may be reflected from the finger. This reflected light may be measured by the illumination sensor 110 to measure the illumination value.

Although it is illustrated in FIG. 8 that the lighting part 120 emits light toward the lower end, the finger may reflect the light emitted from the front surface direction. In addition, it may be not only a user's finger but also any object that reflects light that approaches near the lighting part 120.

It is illustrated in FIG. 8 that the lighting part 120 is protruded outward from the bezel, but this is only an example. The same principle may be applied to various disposition structures illustrated in FIG. 6, FIG. 7, and structures not illustrated herein.

In addition, if it is a user's finger or an object that approaches the lighting part 120, the light may be reflected toward various directions due to a curve.

Referring to FIG. 8, it is illustrated that the light emitted from the lighting part 120 is reflected from a finger and that the illumination sensor 110 measure the reflected light. However, the illumination sensor 110 may measure not only the light emitted from the lighting part 120 but also the light reflected by an external light source. For example, in the day time, when a finger approaches, the illumination sensor 110 may measure a light emitted from the lighting part 120 and a light by the external light source.

Figure 9:
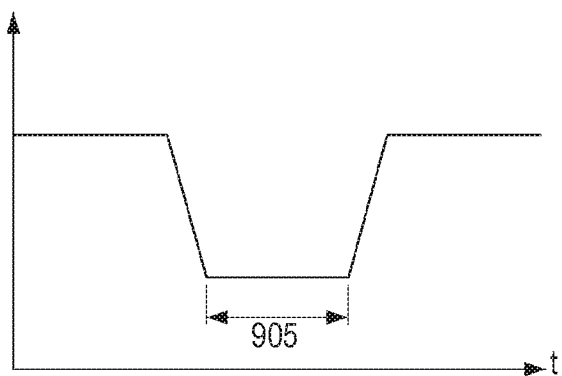
FIGS. 9 and 10 are diagrams illustrating output waveform graphs of the illumination sensor in various operation states.
Figure 9:
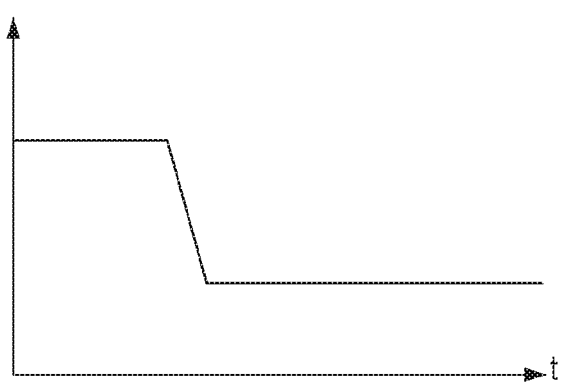
Figure 9:
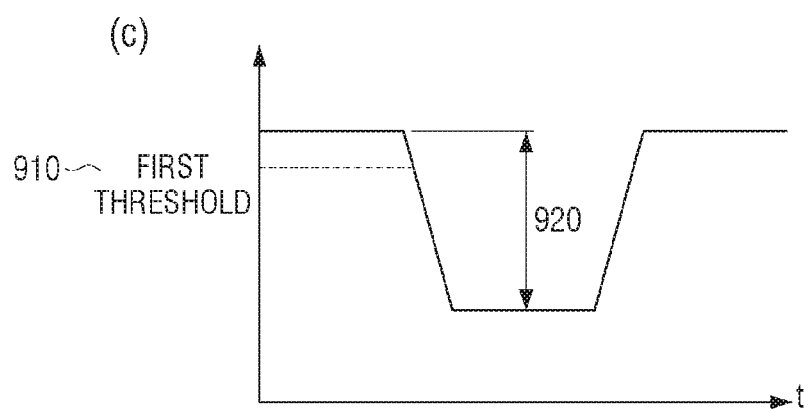
Figure 10:
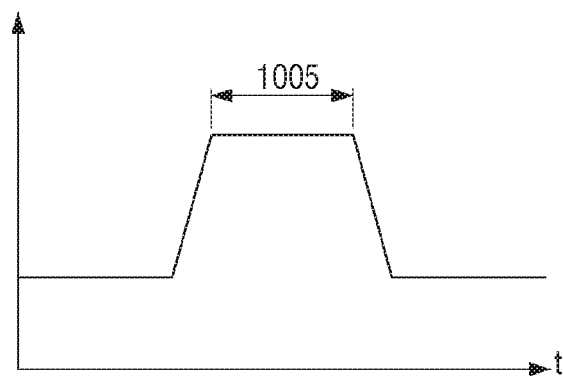
Figure 10:
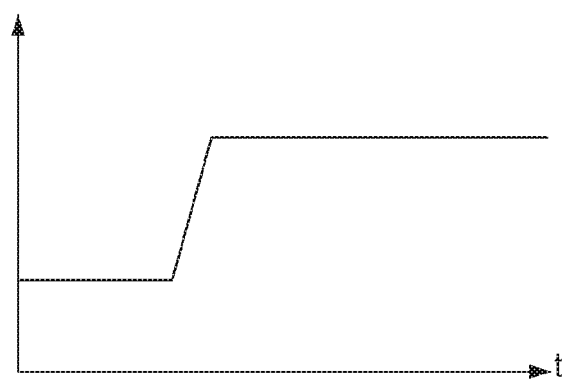
Figure 10:
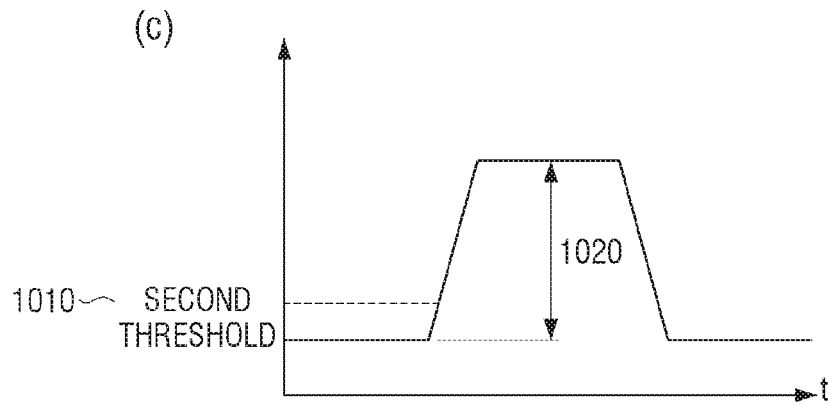

FIGS. 9 and 10 are diagrams illustrating output waveform graphs of the illumination sensor 110 in various operation states.

Sections (a), (b) and (c) of FIG. 9 are diagrams illustrating a case where the illumination value measured by the illumination sensor 110 is descended.

Referring to FIG. 9, a case where the illumination value measured by the illumination sensor 110 is descended may refer to a case where an ambient illumination of the electronic apparatus 100 is bright. The case where the ambient illumination is bright refers to, as described above, a case where the sunlight of the daytime enters, a case where a light is turned on indoors, or a case where a power of the display of the electronic apparatus 100 is turned on.

When the power of the display of the electronic apparatus 100 is turned on, the illumination sensor 110 may determine that a surrounding environment of the electronic apparatus 100 is bright in the same manner as a case where the light enters from outside due to the light emitted from the screen.

Section (a) of FIG. 9 illustrates that, while the illumination value measured by the illumination sensor 110 is maintained constantly, when the user approaches his or her finger, the illumination value falls. In addition, the user separates a finger made to approach the illumination sensor 110 again from the illumination sensor 110, the illumination value returns. In addition, an operation of descending for a predetermined time 905 may be recognized as one pattern.

The processor 115 may, when the illumination value is descended and returned for a predetermined time 905, control a predetermined operation to be immediately carried out, and when the operation of descending operation for a predetermined time is recognized as one pattern and a plurality of patterns are recognized, control a predetermined operation to be carried out.

Section (b) of FIG. 9 represents a case in which the illumination measured by the illumination sensor 110 is maintained constantly, falled, and does not return. For example, the section (b) of FIG. 9 may refer to an action that the user constantly approaches his or her finger to the lighting part and maintains the behavior. When the illumination value is descended and does not return for a predetermined time, the processor 115 may be controlled to carry out a predetermined operation and to be recognized as one pattern.

Section (c) of FIG. 9 is a diagram specifically illustrating a graph of section (a) of FIG. 9. The first threshold 910 may be a minimum value from among an average of illumination values sensed when a peripheral illumination of the electronic apparatus 100 is bright and an average of illumination values sensed when a peripheral illumination of the electronic apparatus 100 is dark and the display of the electronic apparatus 100 is turned on.

The first threshold 910 may be changed according to a use environment of the electronic apparatus 100 and may be directly input by the user. In a case in which a pattern that the illumination sensor 110 is maintained constantly, descends, and returns is shown, it may be determined that the user has carried out an operation of controlling the electronic apparatus 100. In this regard, setting the first threshold 910 may be such that the processor 115 does not judge that a change of illumination value not intended by the user is a user command.

For example, even in a case where a brightness of a TV screen is changed or an intensity of external light is changed regardless of a user's intention, a pattern that the illumination value descends and returns may be shown. Accordingly, the first threshold may be set to prevent such a case as much as possible.

Likewise, the falling width 920 is measured, and when the illumination value is falled by only more than a predetermined magnitude or by only less than a predetermined magnitude, it may be controlled such that the processor 115 may recognize it as a user command.

The predetermined values 905, 910, 920 illustrated in sections (a), (b) and (c) of FIG. 9 may be modified according to a user's intention or a surrounding environment, and the modification process may be automatically carried out according to a pre-stored procedure or may be arbitrarily changed by the user.

Sections (a), (b) and (c) of FIG. 10 are diagrams illustrating a case where the illumination value measured by the illumination sensor 110 rises.

Referring to FIG. 10, a case where the illumination value measured by the illumination sensor 110 rises may refer to a case where an ambient illumination of the electronic apparatus 100 is dark. A case where an ambient illumination of the electronic apparatus 100 is dark may refer to a case where it is nighttime and all indoor lights are turned off. However, in addition to the usual case, when the weather is dark or a curtain is installed indoors other than general cases, it may be a case where all of the outside light is blocked. This is not the absolute standard but may be determined according to a change of illumination value.

Section (a) of FIG. 10 illustrates that, while the illumination value measured by the illumination sensor 110 is maintained constantly, when the user approaches his or her finger, the illumination value rises. In addition, the user separates a finger made to approach the illumination sensor 110 again from the illumination sensor 110, the illumination value returns. In addition, an operation of ascending for a predetermined time 1005 may be recognized as one pattern.

The processor 115 may, when the illumination value rises and returns for a predetermined time 1005, control a predetermined operation to be immediately carried out, and when the operation of descending operation for a predetermined time is recognized as one pattern and a plurality of patterns are recognized, control a predetermined operation to be carried out.

Section (b) of FIG. 10 represents a case in which the illumination measured by the illumination sensor 110 is maintained constantly, rises, and does not return. For example, the section (b) of FIG. 9 may refer to an action that the user constantly approaches his or her finger to the lighting part 120 and maintains the behavior. When the illumination value falls and does not return for a predetermined time, the processor 115 may be controlled to carry out a predetermined operation and to be recognized as one pattern.

Section (c) of FIG. 10 is a diagram specifically illustrating a graph of section (a) of FIG. 10.

The second threshold 1010 may be an average of illumination values which are sensed when the peripheral illumination of the electronic apparatus 100 is dark and all displays of the electronic apparatus 100 are turned off.

The second threshold 1010 may be changed according to a use environment of the electronic apparatus 100. In a case in which a pattern that the illumination sensor 110 is maintained constantly, ascends, and returns is shown, it may be determined that the user has carried out an operation of controlling the electronic apparatus 100. In this regard, setting the second threshold 1010 may be such that the processor 115 does not judge that a change of illumination value not intended by the user is a user command.

For example, even in a case where a brightness of a TV screen is changed or an intensity of external light is changed regardless of a user's intention, a pattern that the illumination value falls and returns may be shown. Accordingly, the second threshold may be set to prevent such a case as much as possible.

Likewise, the rising width 1020 is measured, and when the illumination value rises by only more than a predetermined magnitude or by only less than a predetermined magnitude, it may be controlled such that the processor 115 may recognize it as a user command.

The predetermined values 1005, 1010 and 1020 illustrated in sections (a), (b) and (c) of FIG. 10 may be modified according to a user's intention or a surrounding environment, and the modification process may be automatically carried out according to a pre-stored procedure or may be arbitrarily changed by the user.

FIG. 11 is a diagram illustrating a pattern of illumination values measured by an illumination sensor 110 according to a power state of the display and a time.

Referring to FIG. 11, the determination may be made by dividing a power state of the display into an on state and an off state. In addition, it is possible to determination whether the ambient illumination is bright or dark by dividing the case where it is daytime and the case where it is nighttime. As described above, when an indoor light is on in the nighttime, the electronic apparatus 100 may determine that the ambient illumination is bright. The external light may refer to an object which emits light, such as sunlight, light bulb, candle and the like. If the time zone is nighttime, the sunlight from among the external lights may not be present. However, even if the time zone is nighttime, an external light, such as a fluorescent light, may be present. Accordingly, when the electronic apparatus 100 recognizes that an ambient illumination is dark, it refers to a state that an external light source is not present, which means that the time zone is nighttime in which the sun has set and a light, such as an indoor light, is not present. Accordingly, the time zone of nighttime may be a case where it is assumed that the indoor light is not turned on.

Referring to FIG. 11, it can be described that a pattern of illumination value is differently shown according to the ambient illumination of the electronic apparatus 100. In a case in which the power state of the display is on and the time zone is daytime (first condition), the ambient illumination of the electronic apparatus 100 is considered bright. Accordingly, when the user approaches his or her finger, a pattern that the illumination value pattern falls and then returns or a pattern that the illumination value pattern falls and maintains may be shown.

In a case in which the power state of the display is on and the time zone is nighttime (second condition), the ambient illumination of the electronic apparatus 100 is considered bright. Since the light emitted from the display itself may be determined by the illumination sensor 110, the case may correspond to a case where the ambient illumination of the electronic apparatus 100 is bright and accordingly, a pattern that the pattern of the illumination value falls and then returns or a pattern that the pattern of the illumination value falls and then maintains may be displayed. In this state, it may be identified whether the illumination value rises or falls through a user setting or an automatic setting function.

In more detail, in the second condition, it is assumed that the ambient illumination of the electronic apparatus 100 is dark. Accordingly, when a finger is approached near the illumination sensor 110, it may be predicted that the light emitted from the lighting part 120 is reflected and the illumination value rises. However, in the second condition, the light emitted from the display itself may be strong, and the illumination value may rather fall. FIG. 11 illustrates a case where the light emitted from the display is strong and thus, the illumination value rises.

However, in the second condition, the illumination value may rise or fall according to the intensity of light emitted from the lighting part 120 and the intensity of light emitted from the display itself.

To determine these various situations, the processor 115 may control an operation of the electronic apparatus 100 by using the first threshold 910 and the second threshold 1010.

In addition, in a case in which the power state of the display is off and the time zone is daytime (third condition), the ambient illumination of the electronic apparatus 100 is considered bright. Accordingly, when the user approaches his or her finger, a pattern that the illumination value pattern falls and then returns or a pattern that the illumination value pattern falls and maintains may be shown.

In addition, in a case in which the power state of the display is off and the time zone is nighttime (fourth condition), the ambient illumination of the electronic apparatus 100 is considered dark. Accordingly, when the user approaches his or her finger, a pattern that the illumination value pattern rises and then returns or a pattern that the illumination value pattern rises and maintains may be shown.

Referring to FIG. 11, the first, second and third conditions correspond to a case where the ambient illumination of the electronic apparatus 100 is bright and thus, a pattern that the illumination value falls and then returns or a pattern that the illumination value falls and then maintains may be shown.

In addition, the fourth condition corresponds to a case where the ambient illumination of the electronic apparatus 100 is dark and thus, a pattern that the illumination value rises and then returns or a pattern that the illumination value rises and then maintains may be shown.

In FIG. 11, four conditions were described to identify which type of illumination value is shown. However, at actual operation, an amount of change of illumination value may be detected to carry out an operation without distinguishing between the four conditions.

For example, the processor 115 may, while the previous illumination value is maintained constantly, when a change that exceeds a predetermined ratio of the previous illumination value is detected, control to immediately carry out a particular operation.

A user may set a predetermined ratio to detect a change that exceeds the predetermined ratio.

Figure 12:
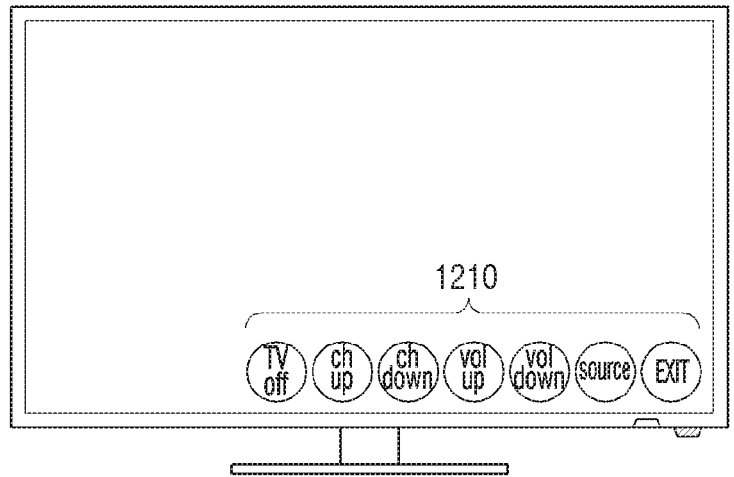
FIGS. 12 and 13 are diagrams illustrating an embodiment of a menu displayed on an electronic apparatus.
Figure 13:
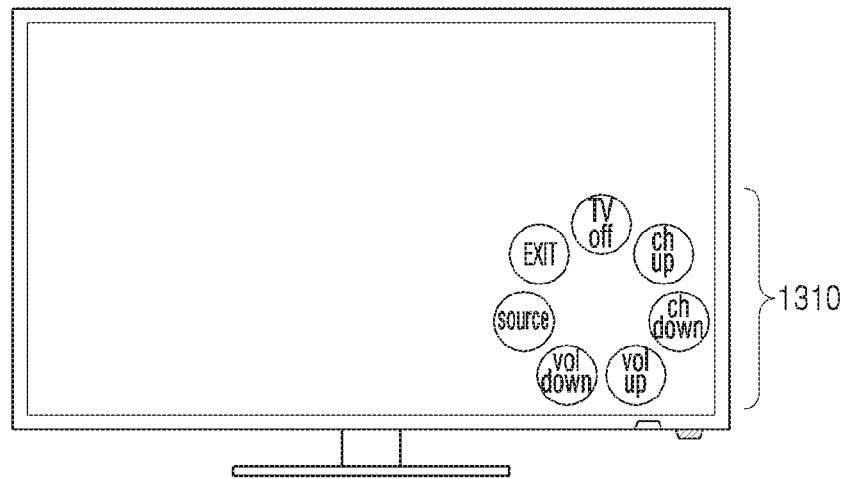

FIGS. 12 and 13 are diagrams illustrating an embodiment of a menu displayed on an electronic apparatus 100.

FIG. 12 is a diagram illustrating an operation of displaying menus displayed on the electronic apparatus 100 at the bottom right portion in a row.

Referring to FIG. 12, menus displayed on the electronic apparatus 100 may be a function of turning off a power of the display (TV off), a function of changing a channel number (ch up, ch down), a function of controlling volume (vol up, vol down), a function of determining an external input (source), and a function of ending a menu (exit). In addition, a group 1210 of the menu may be displayed in a horizontal form.

FIG. 13 is a diagram illustrating an operation of displaying menus displayed on the electronic apparatus 100 at the bottom right portion in a circular shape.

Referring to FIG. 13, the menus displayed on the electronic apparatus 100 may be displayed in a circular shape 1310.

In FIGS. 12 and 13, the menus are displayed in a horizontal or circular form. However, the menus may be displayed vertically, and may be changed differently according to a user setting.

Figure 14:
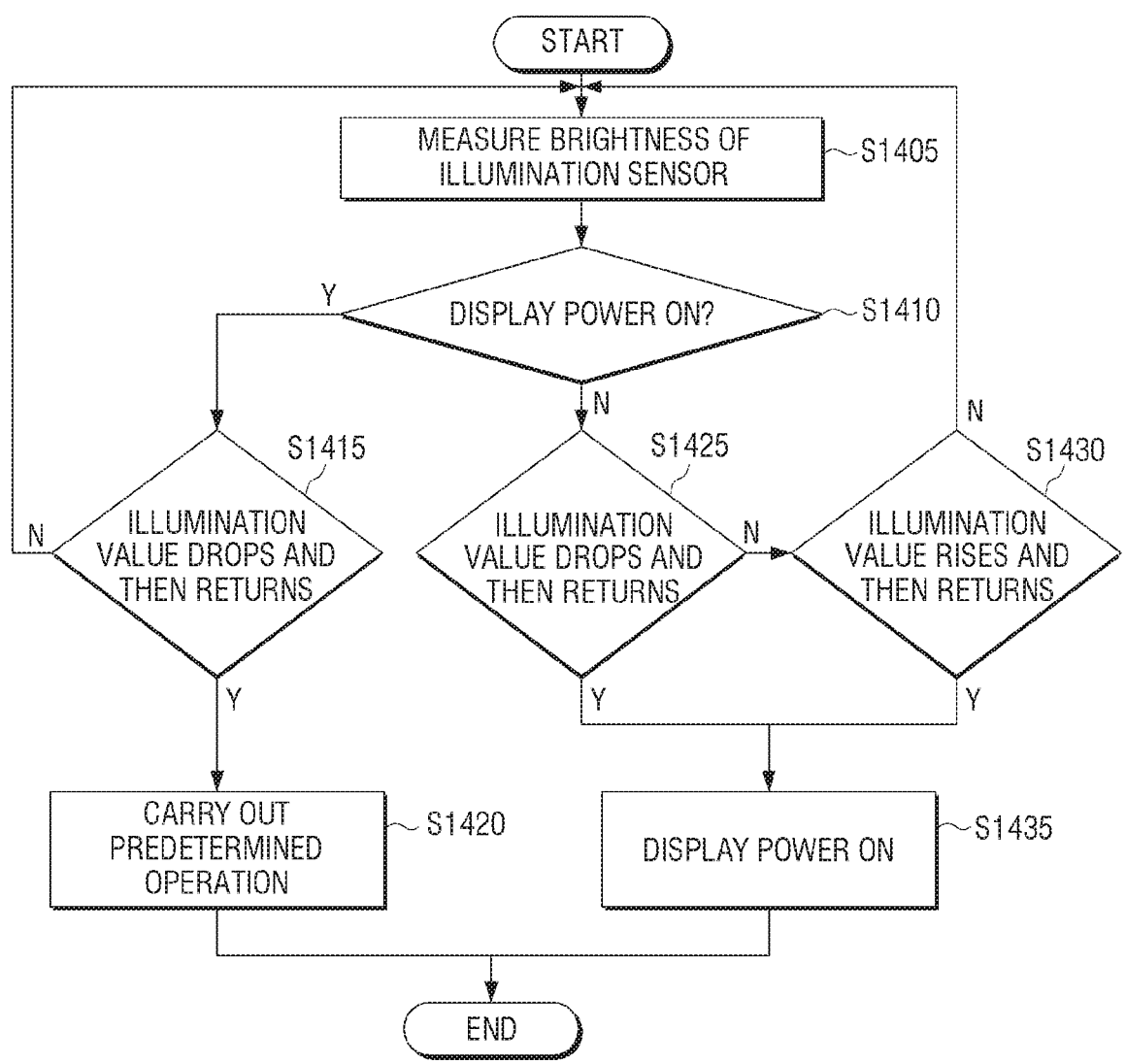
FIG. 14 is a flowchart provided to explain a method for controlling an operation, according to an embodiment.

FIG. 14 is a flowchart provided to explain a method for controlling an operation, according to an embodiment.

Referring to FIG. 14, the illumination sensor 110 measures an ambient illumination (brightness) of an electronic apparatus 100, at operation S1405. Thereafter, the processor 115 may determine whether the power of the display is in an off state, at operation S1410.

When the power of the display is in an on state, the processor 115 may determine whether the illumination value falls for a predetermined time and then returns, at operation S1415.

When the illumination value falls and then returns, the processor 115 may carry out a predetermined operation, at operation S1420. In a case of a different pattern that the illumination value falls and then does not return, the process returns to operation S1405 and the brightness may be measured by the illumination sensor 110. A different pattern that the illumination value falls and then does not return may refer to a case where the illumination value falls and then maintains or a case where the illumination value falls and then does not change.

When the power of the display is in an off state, the processor 115 may determine whether the illumination value falls for a predetermined time and then returns, at operation S1425. If the illumination sensor falls for a predetermined time and then returns, the processor 115 may change the power of the display to an off state, at operation S1435.

In addition, unless the illumination value falls and then returns at operation S1425, it may be determined whether it corresponds to a pattern that the illumination value rises and then returns, at operation S1430. When a pattern the illumination value rises and then returns is identified, the processor 115 may change the power of the display to an off state, at operation S1435.

If the illumination value rises and then does not return at operation S1430, the process returns to operation S1405 and the brightness may be measured by the illumination sensor 110.

Figure 15:
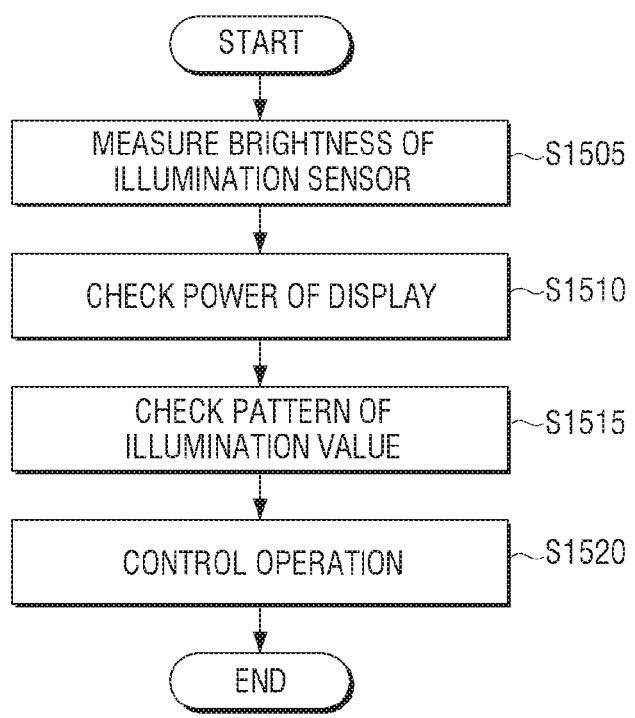
FIG. 15 is a flowchart provided to explain a method for controlling an operation, according to another embodiment.

FIG. 15 is a flowchart provided to explain a method for controlling an operation, according to another embodiment.

Referring to FIG. 15, the illumination sensor 110 measures a brightness, at operation S1505 and thereafter, identifies whether the power of the display is turned on, at operation S1510. In addition, a pattern of the illumination value is identified at operation S1515, and an operation of the electronic apparatus 100 is controlled at operation S1520. The operations S1515 and S1520 may specifically include the steps as follows.

The operations S1515 and S1520 may include the steps of, while the illumination value of the illumination sensor 110 is detected to be greater than or equal to a first threshold, when the illumination value falls for a predetermined time and then returns, carrying out a predetermined operation, and in a state in which the display of the electronic apparatus 100 is turned off, while the illumination value of the illumination sensor 110 is detected to be greater than or equal to the first threshold, when the illumination value falls for a predetermined time and then returns, or while illumination value of the illumination sensor 110 is detected to be less than or equal to a second threshold less than the first threshold, when the illumination value rises for a predetermined time and then returns, turning on the display.

Meanwhile, a method for controlling an operation of the electronic apparatus 100 may include detecting an illumination value of an illumination sensor 110 provided in the electronic apparatus 100. In this regard, the method may include, in a state in which a display of the electronic apparatus 100 is turned on, when an illumination value of the illumination sensor 110 is detected to be greater than or equal to a first threshold, falls for a predetermined time and then, returns, carrying out a predetermined operation. In this regard, the carrying out the predetermined operation may include detecting that in a state in which the display of the electronic apparatus 100 is turned on, when the illumination value of the illumination sensor 110 is detected to be greater than or equal to the first threshold, falls for a predetermined time, and then returns is one pattern, and when the same type of patterns is repeated at least twice, carrying out the predetermined operation.

The method may include, in a state in which the display of the electronic apparatus 100 is turned off, when the illumination value of the illumination sensor 110 is detected to be greater than or equal to the first threshold, falls for a predetermined time, and returns, or the illumination value of the illumination sensor 110 is detected be less than or equal to the first threshold, rises for a predetermined time, and returns, turning on the display of the electronic apparatus 100. In this regard, the turning on the display of the electronic apparatus 100 may include distinguishing between, in a state in which the display of the electronic apparatus 100 is turned off, a case where the illumination value of the illumination sensor is detected to be greater than or equal to the first threshold, falls for a predetermined time, and then returns and a case where the illumination value of the illumination sensor 110 is detected to be less than or equal to a second threshold less than the first threshold, rises for a predetermined time, and then returns and recognizing them as different patterns, and when the same type of patterns is repeated at least twice, turning on the display.

In addition, the predetermined operation may be an operation of turning on or off the display of the electronic apparatus 100. In addition, the carrying out the predetermined operation may include, in a state in which the electronic apparatus 100 is turned on, when the illumination value of the illumination sensor 110 is detected to be greater than or equal to the first threshold, falls for a predetermined time, and returns, displaying at least one menu, and when one of the displayed menus is selected, carrying out an operation corresponding to the selected menu.

In addition, the carrying out the operation corresponding to the selected menu may include, in a state in which a cursor is displayed on a menu, when a sensing pattern that the illumination value of the illumination sensor 110 is detected to be greater than or equal to the first threshold and descends for a predetermined time or longer is detected, choosing to carry out an operation corresponding to the menu on which the cursor is displayed.

In addition, the carrying out the predetermined operation may further include displaying a cursor on at least one menu, and every time when a sensing pattern that the illumination value of the illumination sensor 110 is detected to be greater than or equal to a first threshold, falls for a predetermined time, and returns is detected, sequentially moving the cursor displayed on the menu.

In addition, the first threshold is the minimum value from among an average of illumination values sensed when a peripheral brightness of the electronic apparatus 100 is bright and the average of illumination values sensed when the electronic apparatus 100 is turned on. The second threshold is the average of illumination values sensed when a peripheral brightness of the electronic apparatus 100 is dark and all displays of the electronic apparatus 100 is turned off. Each of the first and second thresholds may be modified according to a use environment of the electronic apparatus 100.

In addition, the method of controlling the operation of the electronic apparatus 100 may further include emitting, by the lighting part 120, light when the display 140 of the electronic apparatus 100 is turned off. The detecting the illumination value of the illumination sensor 110 provided in the electronic apparatus 100 may include detecting, by the illumination sensor 110, light emitted from the lighting part 120.

In addition, in a computer-readable recording medium including a program for executing a method of controlling an operation of an electronic apparatus 100, the method may include detecting an illumination value of the illumination sensor 110 provided in the electronic apparatus 100, in a state in which a display of the electronic apparatus 100 is turned on, when an illumination value of the illumination sensor 110 is detected to be greater than or equal to a first threshold, falls for a predetermined time, and then returns, carrying out a predetermined operation, and in a state in which the display of the electronic apparatus 100 is turned off, when the illumination value of the illumination sensor 110 is detected to be greater than or equal to the first threshold, falls for a predetermined time, and then returns, or the illumination value of the illumination sensor 110 is detected to be less than or equal to a second threshold less than the first threshold, rises for a predetermined time and then returns, turning on the display of the electronic apparatus 100.

The method for controlling the operation of the electronic apparatus 100 according to an embodiment may include measuring, by the illumination sensor 110, a change of illumination value due to the light emitted from the lighting part 120 being reflected even when a peripheral illumination of the electronic apparatus 100 is dark. For example, even in a situation where an internal lighting is not turned on in the night time, the user may see the light emitted from the lighting part 120, and if the user approaches a finger, the illumination value may be changed. The processor 115 may control an operation of the electronic apparatus 100 based on the amount of change of illumination value.

The user may store a predetermined time 905, 1005, a threshold 910, 1010, the illumination value change width 920, 1020, and the like in advance, and control an operation of the electronic apparatus 100 only when a particular condition is met. Through these conditions, the processor 115 may determine various exceptional situations not intended by the user.

For example, it may be determined that the illumination value is changed due to an action of passing by the electronic apparatus 100 or an action of suddenly turning on an internal light and the like is not to control an operation of the electronic apparatus 100. Accordingly, the processor 115 may store a predetermined time 905, 1005, a threshold 910, 1010, the illumination value change width 920, 1020, and the like in advance, control an operation of the electronic apparatus 100 only when a particular condition is met, and determine exceptional situations.

In addition, the above-described method of controlling the operation of the electronic apparatus 100 may be realized as at least one execution program to execute the above-described controlling method, and such an execution program may be stored in a non-transient readable recording medium.

A non-transitory computer readable medium may refer to a machine-readable medium or device that stores data semi-permanently and not for a short period of time, such as a register, cache, memory, and the like. In detail, the above-described various applications or programs may be stored in the non-transitory computer readable medium, for example, a compact disc (CD), a digital versatile disc (DVD), a hard disc, a Blu-ray disc, a universal serial bus (USB), a memory card, a read only memory (ROM), and the like, and may be provided.

On the other hand, the description of the present disclosure is not necessarily limited to these embodiments, as long as all the constituent elements constituting the embodiment of the present disclosure are described as being combined or operated in one operation. That is, within the scope of the present disclosure, all of the elements may be selectively coupled to one or more of them. In addition, although all of the components may be implemented as one independent hardware, some or all of the components may be selectively combined and implemented as a computer program having a program module to perform a part or all of the functions in one or a plurality of hardware. The codes and code segments that make up the computer program may be easily deduced by those skilled in the art of the present disclosure. Such a computer program may be stored in a computer-readable non-transitory computer readable media and read and executed by a computer to implement embodiments of the present disclosure.

The methods according to the above-described embodiments may be realized as applications that may be installed in the existing electronic apparatus.

Meanwhile, the methods according to various embodiments of the present disclosure described above can be implemented by only software/hardware upgrade for existing electronic apparatus.

The above-described embodiments may be executed through an embedded server in the electronic apparatus or through an external server outside the electronic apparatus.

The above-described method of controlling the electronic apparatus according to the embodiment described above may be implemented in a program and provided to electronic apparatuses. In particular, the program including a method for controlling an electronic apparatus according to embodiments may be stored in a non-transitory computer readable medium and provided therein.

Various embodiments described above may be embodied in a recording medium that may be read by a computer or a similar apparatus to the computer by using software, hardware, or a combination thereof. According to the hardware embodiment, embodiments that are described in the present disclosure may be embodied by using at least one selected from Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, micro-controllers, microprocessors, electrical units for performing other functions. In some cases, embodiments described herein may be implemented by processor 140 itself. According to a software implementation, embodiments such as the procedures and functions described herein may be implemented with separate software modules. Each of the software modules may perform one or more of the functions and operations described herein.

Meanwhile, the computer instructions for carrying out a processing operation in the electronic apparatus according to various embodiments of the present disclosure described above may be stored in a non-transitory computer-readable medium. Computer instructions stored on such non-transitory computer-readable medium may cause a particular device to perform processing operations in the electronic apparatus according to various embodiments described above when executed by a processor of the particular device.

The non-transitory computer readable medium refers to a medium that stores data semi-permanently rather than storing data for a very short time, such as a register, a cache, a memory or etc., and is readable by an apparatus. In detail, the aforementioned various applications or programs may be stored in the non-transitory computer readable medium, for example, a compact disc (CD), a digital versatile disc (DVD), a hard disc, a Blu-ray disc, a universal serial bus (USB), a memory card, a read only memory (ROM), and the like, and may be provided.

While embodiments have been shown and described, it will be understood by those skilled in the art that various changes in form and detail may be made therein without departing from the spirit and principles of the present disclosure, the scope of which is defined by the appended claims and their equivalents.

What is claimed is:

1. An electronic apparatus, comprising:
a display;
an illumination sensor; and
a processor configured to control an operation of the electronic apparatus according to an illumination value sensed by the illumination sensor, wherein the processor is further configured to:
  identify a time between the illumination value changing from a first illuminance value range to a second illuminance value range and changing back to the first illuminance value range from the second illuminance value range,
  identify whether the time is longer than a predetermined time,
  carry out a predetermined operation based on the time being longer than the predetermined time while a power state of the display is on,
  change the power state of the display from off to on based on the time being longer than the predetermined time while the display is off,
  while the power state of the display is on, based on the illumination value being greater than or equal to a first threshold, falling below the first threshold for the predetermined time and thereafter being greater than or equal to the first threshold, display at least one menu, and carry out an operation based on a selection corresponding to the displayed at least one menu, and
  display a cursor on the at least one menu, and sequentially move the cursor every time the illumination value is greater than or equal to the first threshold, falls below the first threshold for the predetermined time, and is thereafter greater than or equal to the first threshold.

2. The electronic apparatus as claimed in claim 1, wherein the processor is further configured to carry out the predetermined operation based on a first pattern being repeated at least twice while the power state of the display is on, the first pattern being: the illumination value being less than or equal to a second threshold, rising above the second threshold for the predetermined time and thereafter being less than or equal to the second threshold.

3. The electronic apparatus as claimed in claim 1, wherein the processor is further configured to, while the power state of the display is off, distinguish between a first pattern where the illumination value is greater than or equal to the first threshold, falls below the first threshold for the predetermined time and is thereafter greater than or equal to the first threshold, and a second pattern where the illumination value is less than or equal to a second threshold, rises above the second threshold for the predetermined time and is thereafter less than or equal to the second threshold, and change the power state of the display from off to on based on a same type of pattern being repeated at least twice.

4. The electronic apparatus as claimed in claim 1, wherein the first illuminance value range and the second illuminance value range correspond to the first threshold and a second threshold,
  wherein the first threshold is a minimum value from among an average of illumination values sensed while a peripheral illumination of the electronic apparatus is bright and an average of illumination values sensed while the peripheral illumination of the electronic apparatus is dark and the power state of the display is on,
  wherein the second threshold is an average of illumination values sensed while the peripheral illumination of the electronic apparatus is dark and the power state of the display is off, and
  wherein each of the first threshold and the second threshold is modifiable according to a use environment of the electronic apparatus.

5. The electronic apparatus as claimed in claim 1, wherein the predetermined operation is an operation to change the power state of the display from on to off based on the power state of the display being on.

6. The electronic apparatus as claimed in claim 1, further comprising:
  a light configured to emit light while the power state of the display is off,
  wherein the light and the illumination sensor are adjacent to each other.

7. The electronic apparatus as claimed in claim 1, wherein the processor is further configured to:
  carry out the predetermined operation based on the illumination value being greater than or equal to the first threshold, falling below the first threshold for the predetermined time and thereafter being greater than or equal to the first threshold while the power state of the display is on,
  change the power state of the display from off to on based on the illumination value being greater than or equal to the first threshold, falling below the first threshold for the predetermined time and thereafter being greater than or equal to the first threshold while the power state of the display is off, and
  change the power state of the display from off to on based on the illumination value being less than or equal to a second threshold, rising above the second threshold for the predetermined time, and thereafter being less than or equal to the second threshold, the second threshold being less than the first threshold while the power state of the display is off.

8. An electronic apparatus, comprising:
a display;
an illumination sensor; and
a processor configured to control an operation of the electronic apparatus according to an illumination value sensed by the illumination sensor,
  wherein the processor is further configured to, identify a time between the illumination value changing from a first illuminance value range to a second illuminance value range and changing back to the first illuminance value range from the second illuminance value range, identify whether the time is longer than a predetermined time, and carry out a predetermined operation based on the time being longer the predetermined time,
  wherein the processor is further configured to, in a state in which the display of the electronic apparatus is on, based on the illumination value being greater than or equal to a first threshold, falling below the first threshold for the predetermined time and thereafter being greater than or equal to the first threshold, display at least one menu, and carry out an operation based on a selection corresponding to the displayed at least one menu,
  wherein the processor is further configured to display a cursor on the at least one menu, and sequentially move the cursor every time the illumination value is greater than or equal to the first threshold, falls below the first threshold for the predetermined time, and is thereafter greater than or equal to the first threshold, and
  wherein the predetermined operation is different based on whether the display is on.

9. The electronic apparatus as claimed in claim 8, wherein the processor is further configured to, in a state in which the cursor is displayed on one menu, based on the illumination value being greater than or equal to the first threshold and falling below the first threshold for the predetermined time or longer, carry out an operation corresponding to the one menu on which the cursor is displayed.

10. A method for controlling an operation of an electronic apparatus including a display and an illumination sensor, the method comprising:
   detecting an illumination value using the illumination sensor provided in the electronic apparatus;
   identifying a time between the illumination value changing from a first illuminance value range to a second illuminance value range and then changing back to the first illuminance value range from the second illuminance value range;
   identifying whether the time is longer than a predetermined time;
   carrying out a predetermined operation based on the time being longer than the predetermined time while a power state of the display is on; and
   changing the power state of the display from off to on based on the time being longer than the predetermined time while the display is off,
   wherein the carrying out the predetermined operation comprises:
      while the power state of the display is on, based on the illumination value being greater than or equal to a first threshold, falling below the first threshold for the predetermined time and thereafter being greater than or equal to the first threshold, displaying at least one menu, and carrying out an operation based on a selection corresponding to the displayed at least one menu; and
      displaying a cursor on the at least one menu, and sequentially moving the cursor every time the illumination value is greater than or equal to the first threshold, falls below the first threshold for the predetermined time, and is thereafter greater than or equal to the first threshold.

11. The method as claimed in claim 10, wherein the predetermined operation is carried out based on a first pattern being repeated at least twice while the power state of the display is on, the first pattern being: the illumination value being greater than or equal to the first threshold, falling below the first threshold for the predetermined time, and thereafter being greater than or equal to the first threshold.

12. The method as claimed in claim 10, wherein the changing the power state of the display from off to on comprises distinguishing between a first pattern where the illumination value is greater than or equal to the first threshold, falls below the first threshold for the predetermined time and is thereafter greater than or equal to the first threshold, and a second pattern where the illumination value is less than or equal to a second threshold, rises above the second threshold for the predetermined time and is thereafter less than or equal to the second threshold, and changing the power state of the display from off to on based on a same type of pattern being repeated at least twice.

13. The method as claimed in claim 10, wherein the first illuminance value range and the second illuminance value range correspond to the first threshold and a second threshold,
   wherein the first threshold is a minimum value from among an average of illumination values sensed while a peripheral illumination of the electronic apparatus is bright and an average of illumination values sensed while the peripheral illumination of the electronic apparatus is dark and the power state of the display is on,
   wherein the second threshold is an average of illumination values sensed while the peripheral illumination of the electronic apparatus is dark and the power state of the display is off, and
   wherein each of the first threshold and the second threshold is modifiable according to a use environment of the electronic apparatus.

14. The method as claimed in claim 10, wherein the predetermined operation is an operation to change the power state of the display from on to off based on the power state of the display being on.

15. The method as claimed in claim 10, wherein the carrying out the operation based on the selection comprises, in a state in which the cursor is displayed on one menu, based on the illumination value being greater than or equal to the first threshold, and falling below the first threshold for the predetermined time, carrying out an operation corresponding to the one menu on which the cursor is displayed.

16. The method as claimed in claim 10, further comprising:
   emitting light, by a light of the electronic apparatus, while the power state of the display is off,
   wherein the detecting the illumination value comprises detecting light emitted from the light.

17. The method as claimed in claim 10, further comprising:
   carrying out the predetermined operation based on the illumination value being greater than or equal to the first threshold, falling below the first threshold for the predetermined time and thereafter being greater than or equal to the first threshold while the power state of the display is on;
   changing the power state of the display from off to on based on the illumination value being greater than or equal to the first threshold, falling below the first threshold for the predetermined time and thereafter being greater than or equal to the first threshold while the power state of the display is off; and
   changing the power state of the display from off to on based on the illumination value being less than or equal to a second threshold, rising above the second threshold for the predetermined time and thereafter being less than or equal to the second threshold, the second threshold being less than the first threshold while the power state of the display is off.

* * * * *